(12) United States Patent
Isotani et al.

(10) Patent No.: US 8,227,780 B2
(45) Date of Patent: Jul. 24, 2012

(54) MEASURING APPARATUS AND MEASURING METHOD FOR MEASURING AXIS TILT OF SHAFT OF MOTOR FOR POLYGON MIRROR

(75) Inventors: Atsuyuki Isotani, Osaka (JP); Masami Kajihara, Osaka (JP)

(73) Assignee: Panasonic Corporation, Osaka (JP)

( * ) Notice: Subject to any disclaimer, the term of this patent is extended or adjusted under 35 U.S.C. 154(b) by 285 days.

(21) Appl. No.: 12/710,582

(22) Filed: Feb. 23, 2010

(65) Prior Publication Data

US 2010/0213359 A1  Aug. 26, 2010

(30) Foreign Application Priority Data

Feb. 24, 2009  (JP) .................... 2009-040799

(51) Int. Cl.
*G01N 21/86* (2006.01)
*G02B 26/08* (2006.01)
*G01B 11/14* (2006.01)

(52) U.S. Cl. .............. 250/559.37; 359/216.1; 356/614

(58) Field of Classification Search ............. 250/231.13, 250/234–236, 559.29, 559.3, 559.39, 559.37; 356/496, 508, 510, 614–624; 359/196.1, 359/211.5, 216.1, 218.1, 219.1, 219.2

See application file for complete search history.

(56) References Cited

U.S. PATENT DOCUMENTS 3,582,214 A   6/1971   Loomis

FOREIGN PATENT DOCUMENTS

| JP | 60-211302 | * 10/1985 |
| JP | 60-211302 A | 10/1985 |

* cited by examiner

*Primary Examiner* — Pascal M Bui Pho
(74) *Attorney, Agent, or Firm* — Brinks Hofer Gilson & Lione

(57) ABSTRACT

A measuring apparatus includes a light source emitting a measuring light, a first photo-detection element directly receiving a part of a reflected light of the measuring light reflected from a shaft to be measured to detect a first light receiving position, and a second photo-detection element directly receiving another part of the reflected light to detect a second light receiving position. An axis tilt angle of the shaft is measured on the basis of a signal output from the first photo-detection element and a signal output from the second photo-detection element.

11 Claims, 5 Drawing Sheets

MEASURING APPARATUS AND MEASURING METHOD FOR MEASURING AXIS TILT OF SHAFT OF MOTOR FOR POLYGON MIRROR

RELATED APPLICATIONS

This application claims priority under 35 U.S.C. §119 to Japanese Patent Application No. JP2009-040799 filed on Feb. 24, 2009, the entire content of which is hereby incorporated by reference.

BACKGROUND OF THE INVENTION

1. Field of the Invention

The present invention relates to a measuring apparatus and measuring method for measuring axis tilt of a shaft of a motor for a polygon mirror, and more particularly, to a measuring apparatus and measuring method for measuring axis tilt of a shaft of a motor for a polygon mirror in a non-contact manner.

2. Description of the Related Art

Recently, in a case where axis tilt of a shaft of a motor for a polygon mirror is measured, for example, the measurement is performed by the following. First, a plate mirror is attached to a leading end of a shaft so that the plate mirror is disposed in a direction perpendicular to an axial direction of the shaft. Next, inclination of the mirror is detected by using an auto-collimator. In this way, axis tilt of the shaft is computed.

In addition, for example, Japanese Patent Unexamined Publication No. 60-211302 discloses a method for measuring an inclination angle of an object to be measured, the object having a columnar smooth outer peripheral surface. This measuring method measures the inclination angle of the object to be measured in a non-contact manner, and then computes a tilt angle of the columnar object to be measured based on the measured inclination angle. The measuring method disclosed in Japanese Patent Unexamined Publication No. 60-211302 will now be described in detail with reference to FIG. 8.

As shown in FIG. 8, a laser beam emitted from light source 101 is irradiated onto object 103 to be measured through optical axis 102, and is radially reflected. The reflected light includes a reflected light proceeding along a direction (returning along a direction of light source 101) of optical axis 102, a reflected light proceeding along first light path 104 having an angle of α with respect to the optical axis 102, and a reflected light proceeding along second light path 105. The reflected light proceeding along first light path 104 is reflected upward by first mirror 106, and first image sensor 107 receives the light. Further, the reflected light proceeding along second light path 105 is reflected upward by second mirror 108, and second image sensor 109 receives the light. Further, the reflected light proceeding along the direction of optical axis 102 is reflected upward by half mirror 110, and third image sensor 111 receives the light. The tilt angle of the object to be measured is computed based on three relative positions detected by three image sensors.

With the method disclosed in the Patent Document 1, in order to detect a Y-axis component of the axis tilt, third image sensor 111 for Y-axis measurement has to be installed in the direction of a light source position. Further, in order to avoid superposition between third image sensor 111 and light source 101, the path of the reflected light is changed by using half mirror 110. For this reason, an optical system such as half mirror 110 is required. In order to eliminate influences such as an installation error of the optical system, there is a problem in that an object to be measured which is used for correction and has no axis tilt has to be prepared to perform offset adjustment.

SUMMARY OF THE INVENTION

A measuring apparatus for measuring axis tilt of a shaft of a motor for a polygon mirror according to the invention includes a light source emitting a measuring light; a first photo-detection element directly receiving a part of a reflected light of the measuring light reflected from a shaft to be measured to detect a first light receiving position; and a second photo-detection element directly receiving another part of the reflected light to detect a second light receiving position. An axis tilt angle of the shaft is measured on the basis of a signal output from the first photo-detection element and a signal output from the second photo-detection element.

In addition, a measuring method for measuring axis tilt of a shaft of a motor for a polygon mirror according to the invention includes emitting a measuring light from a light source; directly receiving a part of a reflected light of the measuring light reflected from a shaft to be measured by using a first photo-detection element to detect a first light receiving position; and directly receiving another part of the reflected light by using a second photo-detection element to detect a second light receiving position. An axis tilt angle of the shaft is measured on the basis of a signal output from the first photo-detection element and a signal output from the second photo-detection element.

With the above configuration of the invention, since a measuring light is irradiated onto a shaft, and a reflected light radially dispersed is directly received by a photo-detection element, it is possible to measure the axis tilt with high accuracy, without using an optical system such as a half mirror.

BRIEF DESCRIPTION OF THE DRAWINGS

FIG. 1 is seen at a direction of a Z-axis.

FIG. 1 is seen at a direction of a plane X-Y.

DETAILED DESCRIPTION OF THE PREFERRED EMBODIMENTS

A preferred embodiment of the invention will now be described in detail. The invention is not limited to the embodiment below.

Figure 1:
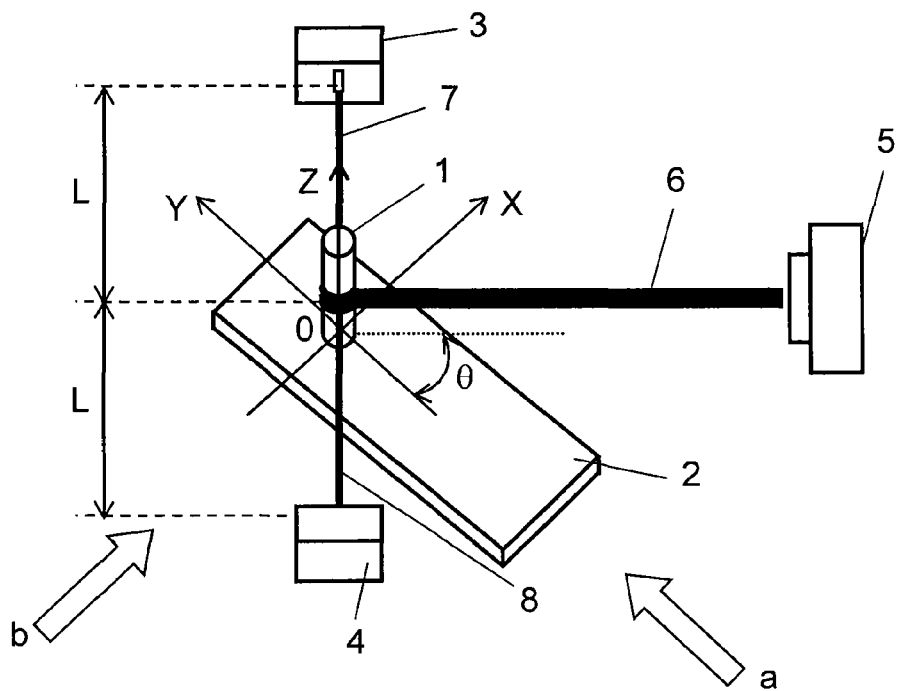
FIG. 1 is a view schematically illustrating a configuration of a measuring apparatus and measuring method for measuring axis tilt of a shaft of a motor for a polygon mirror according to an embodiment of the invention.

FIG. 1 is a view schematically illustrating a configuration of a measuring apparatus and measuring method for measuring axis tilt of a shaft of a motor for a polygon mirror according to an embodiment of the invention.

As shown in FIG. 1, an object to be measured, that is, shaft (a shaft to be measured) 1 of a motor for a polygon mirror is disposed on measuring table 2 made of an iron plate. In this embodiment, a contact portion between shaft 1 to be measured and measuring table 2 is set as an original point. On a main surface of the measuring table, an X-axis is set in an arbitrary direction, and a Y-axis is set in a direction perpendicular to the X-axis.

First photo-detection element 3 and second photo-detection element 4 are disposed so that the first photo-detection element and the second photo-detection element are on the same straight line as shaft 1 to be measured. In this embodiment, a straight line connecting first photo-detection element 3 and second photo-detection element 4 is disposed so as to be in parallel with measuring table 2.

In this instance, first photo-detection element 3 is a photo-detection element that measures the X-axis. First photo-detection element 3 directly receives reflected light 7 of measuring light 6 which is emitted from light source 5 and is reflected from shaft 1 to be measured. In this way, first photo-detection element 3 detects a first light receiving position.

Second photo-detection element 4 is a photo-detection element that measures the Y-axis. Second photo-detection element 4 directly receives reflected light 8 different from reflected light 7 incident upon first photo-detection element 3. In this way, second photo-detection element 4 detects a second light receiving position.

The light source is disposed in a direction of a perpendicular bisector of the straight line connecting first photo-detection element 3 and second photo-detection element 4. In this way, first photo-detection element 3 and second photo-detection element 4 are disposed at a position of line symmetry on the basis of an optical axis of the light emitted from light source 5. The reason for such displacement will be described with reference to FIG. 2.

Figure 2:
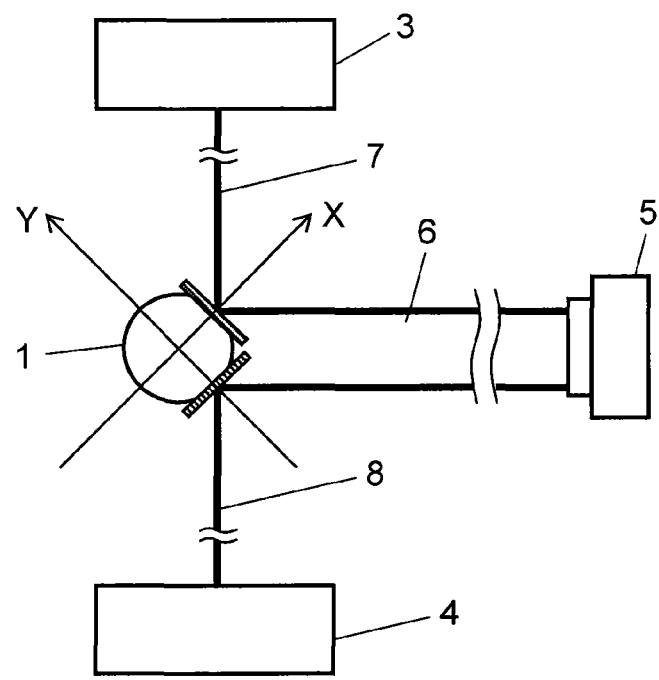
FIG. 2 is a plan view of a shaft to be measured in FIG. 1, which is seen from above.

FIG. 2 is a plan view of shaft 1 to be measured in FIG. 1, which is seen from above. As shown in FIG. 2, a part of measuring light 6 emitted from light source 5 is reflected from a microfacet on an outer peripheral surface of shaft 1 to be measured having a circular cross-section, which becomes reflected light 7 received by first photo-detection element 3 for measurement of the X-axis. The microfacet is a surface perpendicular to the X-axis. In order to obtain inclination in the direction of the X-axis, consequently, it is required to measure the inclination of the microfacet. For this reason, the position to detect the reflected light having inclination information on the microfacet becomes a displacement position of first photo-detection element 3. A displacement position of second photo-detection element 4 for measurement of the Y-axis is determined by the same method.

As such, the measuring apparatus of this embodiment includes light source 5 emitting measuring light 6, first photo-detection element 3 which directly receives a part of the reflected light of the measuring light 6 reflected from the shaft 1 to be measured to detect the first light receiving position, and second photo-detection element 4 which directly receives another part of the reflected light to detect the second light receiving position. The measuring apparatus of this embodiment measures an axis tilt angle of shaft 1 on the basis of a signal output from first photo-detection element 3 and a signal output from second photo-detection element 4, as described below.

The method for measuring the axis tilt angle of shaft 1 to be measured according to this embodiment will now be described.

As shown in FIG. 1, a laser beam, that is, measuring light 6 emitted from light source 5 is irradiated onto shaft 1 to be measured, and then is radially reflected from shaft 1 to be measured, which forms the reflected light. A part of the reflected light is directly incident on first photo-detection element 3. Further, other reflected light 8, which is different from reflected light 7 incident on first photo-detection element 3, is directly incident on second photo-detection element 4. Herein, the expression "directly incident on first photo-detection element 3 or second photo-detection element 4" means the following. That is, reflected light reflected from shaft 1 to be measured is incident on first photo-detection element 3 (or second photo-detection element 4) from shaft 1 to be measured, without passing through an optical system such as a mirror or a half mirror, and other objects.

The laser beam incident on first photo-detection element 3 or second photo-detection element 4 is converted into detection position $X_Z$ or $Y_Z$ consisting of a predetermined value corresponding to light intensity of the incident position. More specifically, charges are generated in proportion to the amount of the incident position in the photo-detection element, and the charges reach a resistant layer as photocurrent. The photocurrent is divided in inverse proportion to a distance between output electrodes of both ends of the resistant layer. Incident detection positions $X_Z$ and $Y_Z$ are calculated on the basis of voltage $V_{X1}$ and $V_{X2}$ which are generated from both ends of the resistant layer.

Figure 3:
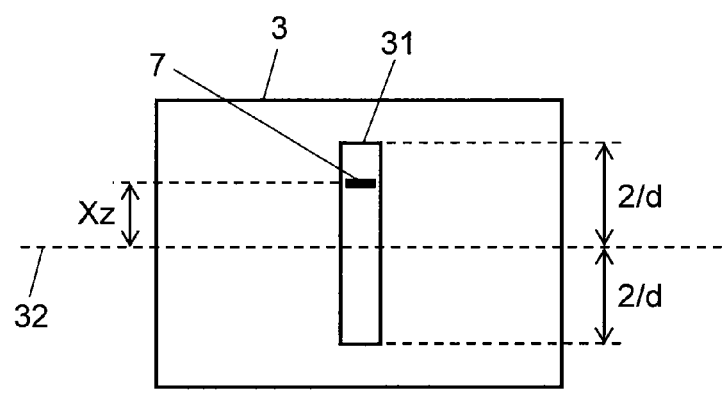
FIG. 3 is a front view of a first photo-detection element which measures an X-axis component.

The method for computing detection position $X_Z$ by using first photo-detection element 3 for measurement of the X-axis component will now be described in detail with reference to FIG. 3. FIG. 3 is a front view of first photo-detection element 3 for measurement of the X-axis component. In this instance, the configuration of second photo-detection element 4 for measurement of the Y-axis component is identical to that of FIG. 3. In a case where reflected light 7 from shaft 1 to be measured is irradiated onto light receiving portion 31 of first photo-detection element 3 at distance $X_Z$ from original point 32 of light receiving portion 31, if incident detection position $X_Z$ of the X-axis is obtained, it is expressed by Equation 1 below. Herein, the voltage output from first photo-detection element 3 is set to $V_{X1}$ and $V_{X2}$, and a longitudinal surface width of light receiving portion 31 in first photo-detection element 3 is set to d.

$$X_Z = \frac{V_{X2} - V_{X1}}{V_{X1} + V_{X2}} \times \frac{d}{2} \qquad \text{Equation 1}$$

As obtained by first photo-detection element 3, if second photo-detection element 4 obtains incident detection position $Y_Z$ of the Y-axis by the same method, it is expressed by Equation 2 below.

$$Y_Z = \frac{V_{Y2} - V_{Y1}}{V_{Y1} + V_{Y2}} \times \frac{d}{2} \qquad \text{Equation 2}$$

Figure 4:
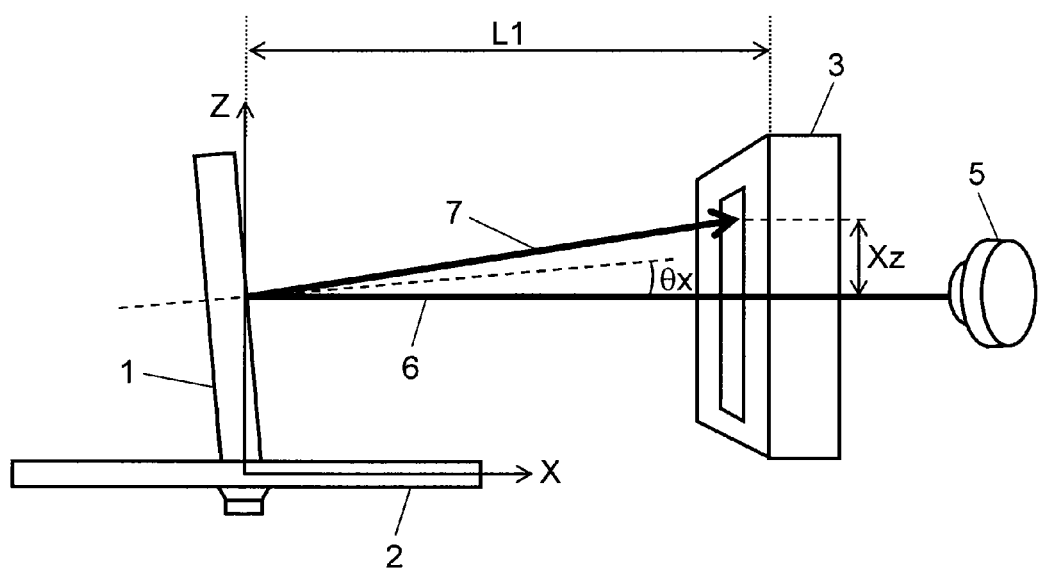
FIG. 4 is a plan view of a plane X-Y when seen in parallel with the plane X-Y at a direction of an arrow "a" shown in FIG. 1.
Figure 5:
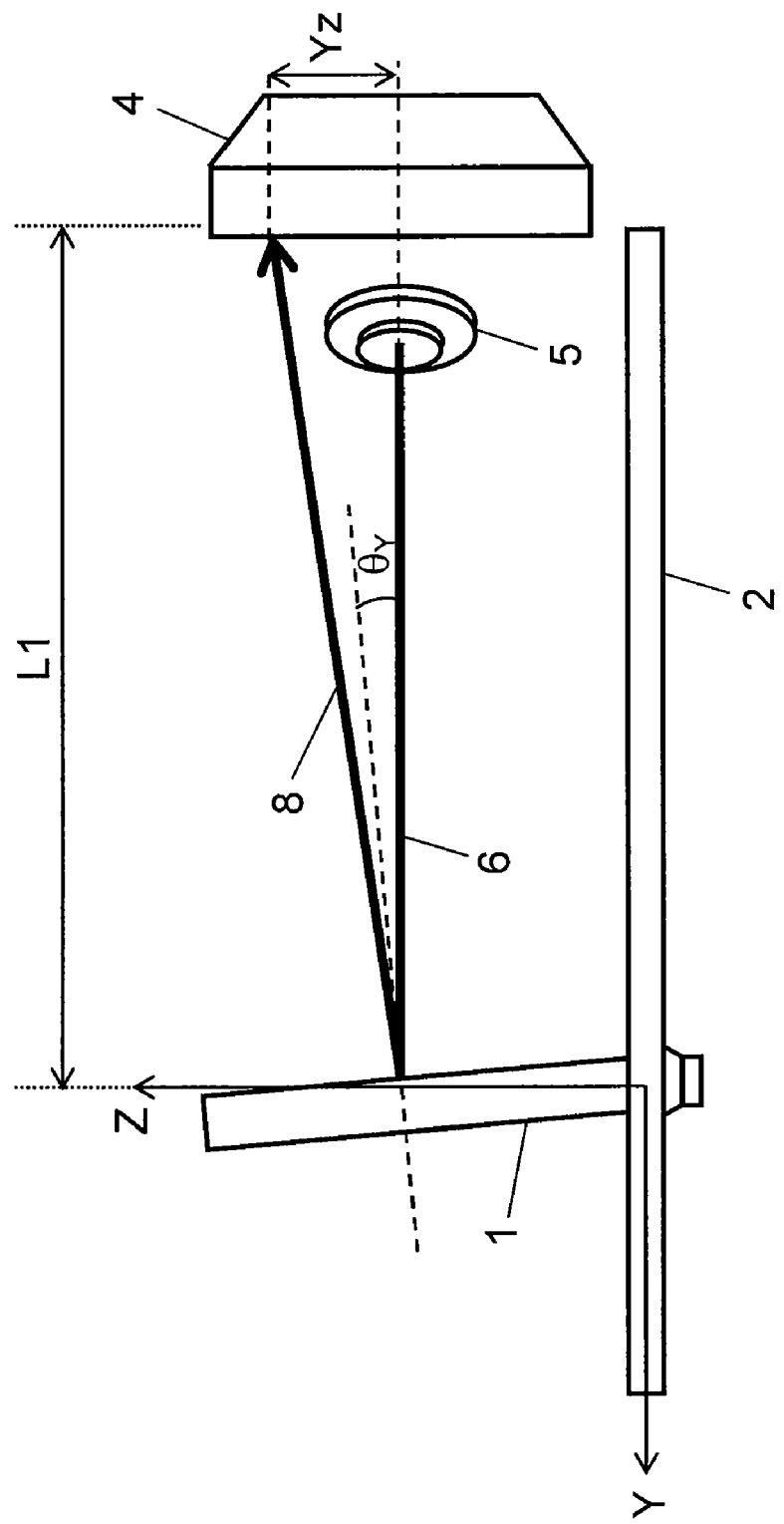
FIG. 5 is a plan view of a plane X-Y when seen in parallel with the plane X-Y at a direction of an arrow "b" shown in FIG. 1.

Next, on the basis of incident detection position $X_Z$ of the X-axis obtained by first photo-detection element 3 and incident detection position $Y_Z$ of the Y-axis obtained by second photo-detection element 4, inclination $\theta_X$ of shaft 1 to be measured in the direction of X-axis and inclination $\theta_Y$ of shaft 1 to be measured in the direction of Y-axis are computed. The method for computing inclination $\theta_X$ and inclination $\theta_Y$ will be described with reference to FIGS. 4 and 5. FIG. 4 is a plan view of plane X-Y when seen in parallel with plane X-Y at a direction (direction in parallel with Y-axis) of arrow "a" shown in FIG. 1. FIG. 5 is a plan view of plane X-Y when seen in parallel with plane X-Y at a direction (direction in parallel with X-axis) of arrow "b" shown in FIG. 1.

As shown in FIG. 4, the distance of the light path, of which measuring light 6 emitted from light source 5 is reflected from shaft 1 to be measured and then is incident on first photo-detection element 3, is set to L1. In this instance, if inclination $\theta_X$ in the direction of X-axis is obtained on the basis of incident detection position $X_Z$ obtained from first photo-detection element 3, it is expressed by Equation 3.

$$\theta_X = \frac{1}{2} \times \tan^{-1}\left[\frac{X_Z}{L1}\right] \qquad \text{Equation 3}$$

Similarly, as shown in FIG. 5, the distance of the light path, of which measuring light 6 emitted from light source 5 is reflected from shaft 1 to be measured and then is incident on second photo-detection element 4, is set to L2. In this instance, if inclination $\theta_Y$ in the direction of Y-axis is obtained on the basis of incident detection position $Y_Z$ obtained from second photo-detection element 4, it is expressed by Equation 4.

$$\theta_Y = \frac{1}{2} \times \tan^{-1}\left[\frac{Y_Z}{L2}\right] \qquad \text{Equation 4}$$

In this embodiment, first photo-detection element 3 and second photo-detection element 4 are disposed so as to set distance L1 of the light path and distance L2 of the light path to the same value L.

In a case where the laser beam is reflected from an inclination surface with an arbitrary incident angle, it is preferable to correct the incident angle. In this instance, $\theta_X$ and $\theta_Y$ are corrected by incident angle $\theta$ of the laser beam shown in FIG. 1. If the inclination of X-axis when correcting the incident angle is $\theta X$ and the inclination of Y-axis when correcting the incident angle is $\theta Y$, the inclination is respectively expressed by Equation 5 and Equation 6 below.

$$\theta X = \frac{1}{2} \times \tan^{-1}\left[\frac{X_Z}{L \times \cos\theta}\right] \qquad \text{Equation 5}$$

$$\theta Y = \frac{1}{2} \times \tan^{-1}\left[\frac{Y_Z}{L \times \cos\theta}\right] \qquad \text{Equation 6}$$

Figure 6:
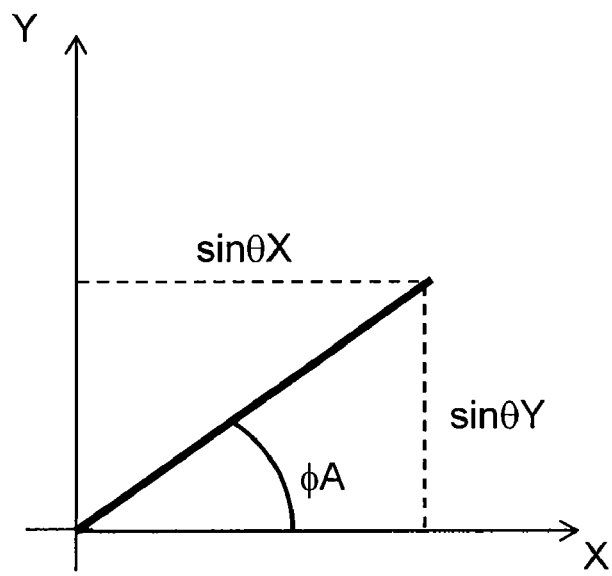
FIG. 6 is a plan view of a plane X-Y when

Next, axis tilt direction $\phi A$ of shaft 1 to be measured is obtained by using Equation 5 and Equation 6. FIG. 6 is a plan view of plane X-Y when FIG. 1 is seen at a direction of Z-axis. As shown in FIG. 6, axis tilt direction $\phi A$ of shaft 1 to be measured is expressed by Equation 7 below.

$$\varphi A = \tan^{-1}\left[\frac{\sin\theta Y}{\sin\theta X}\right] \qquad \text{Equation 7}$$

Figure 7:
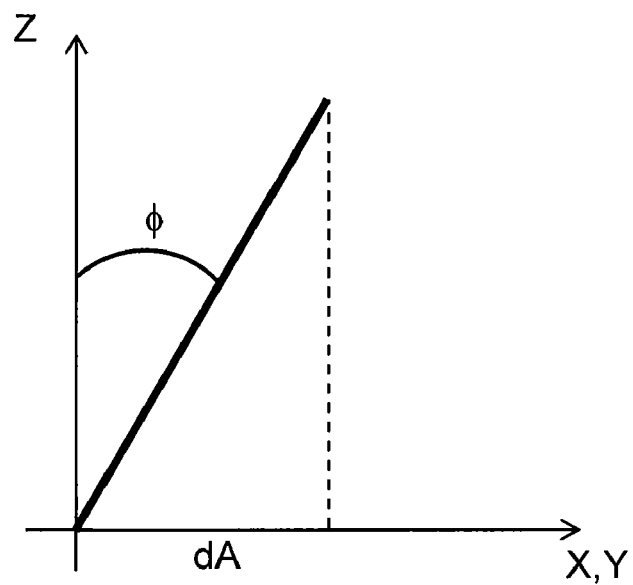
FIG. 7 is a plan view of a plane X-Y when
Figure 8:
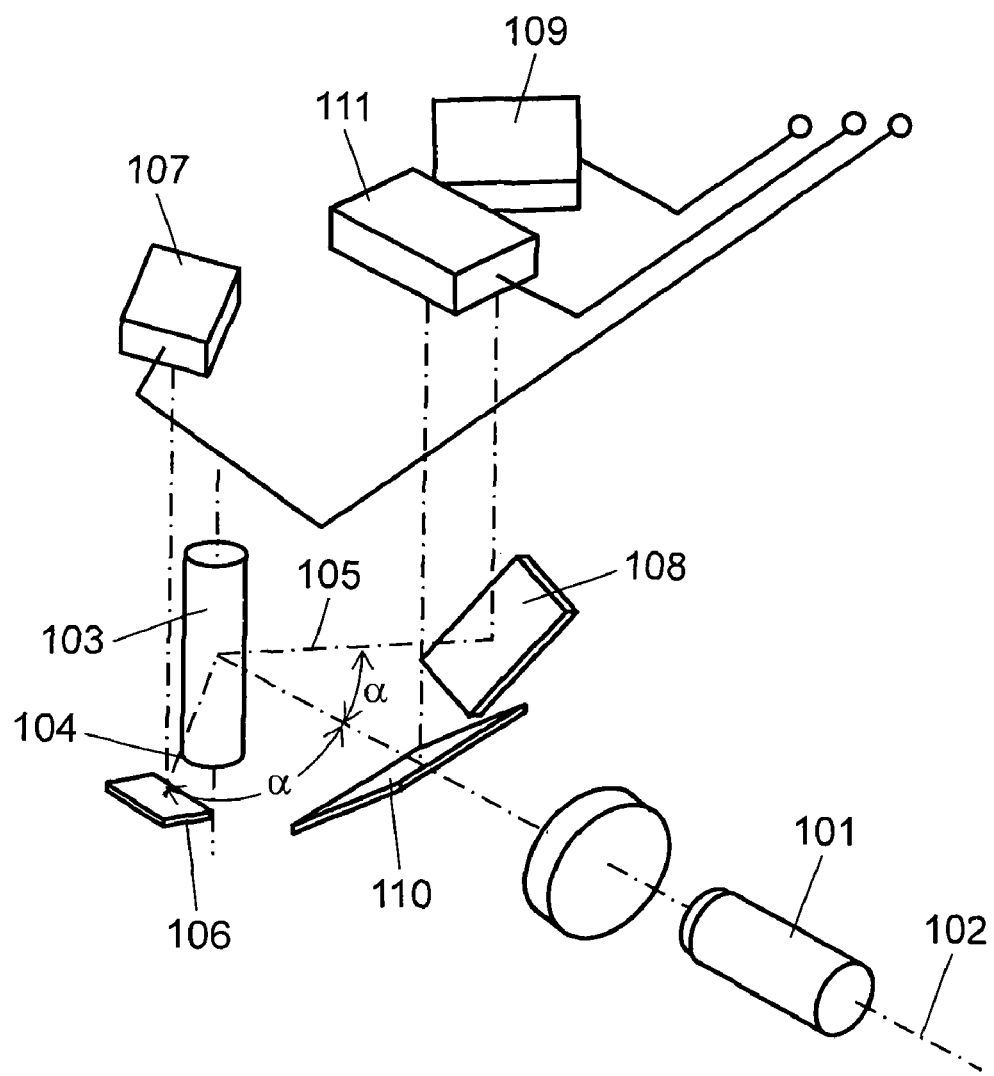
FIG. 8 is a view schematically illustrating a configuration of a measuring apparatus and measuring method for measuring axis tilt of a shaft of a motor for a polygon mirror according to a related art.

Axis tilt angle $\phi$ of shaft 1 to be measured is expressed by Equation 8 on the basis of FIG. 7. FIG. 7 is a plan view of plane X-Y when FIG. 1 is seen at a direction of plane X-Y.

$$\sin\phi = dA = \sqrt{\sin^2\theta X + \sin^2\theta Y}$$

$$\phi = \sin^{-1}\sqrt{\sin^2\theta X + \sin^2\theta Y} \qquad \text{Equation 8}$$

As described above, the measuring apparatus and the measuring method of the invention compute the axis tilt angle of shaft 1 by irradiating measuring light 6 emitted from light source 5 onto shaft 1, directly receiving reflected light 7 and reflected light 8, which are a part of the reflected light radially dispersed, by two photo-detection elements 3 and 4, and computing the axis tilt of the X-axis component and the Y-axis component. That is, the measuring apparatus and the measuring method of the invention measure the axis tilt angle of shaft 1 on the basis of the signal respectively output from photo-detection elements 3 and 4.

According to the measuring apparatus and the measuring method of the invention, since the mirror does not need to be attached to the leading end of the shaft as in the related art, it can shorten an inspection tact time, so that the axis tilt of the shaft can be measured in line. Further, since the configuration of the apparatus is simple and does not use a complex optical system which becomes a source of errors, it is possible to measure the axis tilt with high accuracy.

In practice, axis tilt was measured on 14 shafts by using an PSD, of which a width d of a light receiving surface was 6 mm, as first and second photo-detection elements 3 and 4, in which the length L of a light path was 150 mm, a laser wavelength was 650 nm, and beam power was 14 mW. In this instance, compared to a measured value of an autocollimator used in a related art, a correlation coefficient is equal to or more than 0.98, and it could be verified to have a high correlation with a measuring method of the related art. Consequently, the measuring apparatus and the measuring method of the invention can measure the axis tilt with high accuracy.

There is no special limit to an application field of the invention, and the invention can be widely used as a measuring method and a measuring apparatus which measure axis tilt of a shaft of a motor for a polygon mirror.

What is claimed is:

1. A measuring apparatus for measuring an axis tilt angle of a shaft of a motor for a polygon mirror, the measuring apparatus comprising:
    a light source configured to emit a measuring light towards the shaft; and
    a photo-detector which has only two photo-detection elements
    one of which is a first photo-detection element configured to directly receive a first side reflection light of the measuring light reflected from the shaft, and
    the other of which is a second photo-detection element configured to directly receive a second side reflection light of the measuring light reflected from the shaft,
    wherein the axis tilt angle of the shaft is measured based solely on a first signal outputted from the first photo-detection element and a second signal outputted from the second photo-detection element.

2. The measuring apparatus of claim 1, wherein the first photo-detection element, the second photo-detection element and the shaft are disposed on a straight line.

3. The measuring apparatus of claim 2, wherein the first photo-detection element and the second photo-detection element are arranged symmetrically with respect to a line linearly connecting the light source and the shaft.

4. The measuring apparatus of claim 1, wherein the first signal is indicative of a first deviation of an incident location of the first side reflection light on the first photo-detection element along a first axis, and the second signal is indicative of a second deviation of an incident location of the second side reflection light on the second photo-detection element along a second axis perpendicular to the first axis.

5. The measuring apparatus of claim 4, wherein the first deviation is a function of a first tilt angle of the shaft in a direction of the first axis, and the second deviation is a function of a second tilt angle of the shaft in a direction of the second axis.

6. The measuring apparatus of claim 5, wherein the first tilt angle and the second tilt angle in combination represent the axis tilt angle of the shaft.

7. A measuring method for measuring an axis tilt angle of a shaft of a motor for a polygon mirror, the measuring method comprising the steps of:
    emitting a measuring light from a light source towards the shaft;
    directly receiving a first side reflection light of the measuring light reflected from the shaft by a first photo-detection element;
    directly receiving a second side reflection light of the measuring light reflected from the shaft by a second photo-detection element; and
    calculating the axis tilt angle of the shaft based solely on a first signal outputted from the first photo-detection element and a second signal outputted from the second photo-detection element.

8. The measuring method of claim 7, wherein calculating the axis tilt angle of the shaft comprises calculating, using the first signal, a first deviation of an incident location of the first side reflection light on the first photo-detection element along a first axis, and calculating, using the second signal, a second deviation of an incident location of the second side reflection light on the second photo-detection element along a second axis perpendicular to the first axis.

9. The measuring method of claim 8, wherein calculating the axis tilt angle of the shaft further comprises calculating a first tilt angle of the shaft in a direction of the first axis, using the first deviation and calculating a second tilt angle of the shaft in a direction of the second axis, using the second deviation.

10. The measuring method of claim 9, wherein calculating the axis tilt angle of the shaft further comprises correcting the first and second tilt angles, using an angle of the measuring light incident upon the shaft.

11. The measuring method of claim 9, wherein calculating the axis tilt angle of the shaft further comprises calculating the axis tilt angle of the shaft, using the first and second tilt angles.

* * * * *